US008172175B2

(12) United States Patent
Lair

(10) Patent No.: US 8,172,175 B2

(45) Date of Patent: May 8, 2012

(54) PIVOTING DOOR THRUST REVERSER FOR A TURBOFAN GAS TURBINE ENGINE

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 1200 days.

(21) Appl. No.: 11/941,371

(22) Filed: Nov. 16, 2007

(65) Prior Publication Data

US 2009/0126340 A1 May 21, 2009

(51) Int. Cl.
*F02K 1/54* (2006.01)
*F02K 1/60* (2006.01)

(52) U.S. Cl. .................... 244/110 B; 244/131; 60/226.2

(58) Field of Classification Search ............. 244/110 B, 244/131, 62, 53 R; 60/226.2; 29/525.01
See application file for complete search history.

(56) References Cited

U.S. PATENT DOCUMENTS 2,847,823 A 8/1958 Brewer
3,347,578 A 10/1967 Sheehan et al.
3,492,821 A 2/1970 Monaghan et al.
3,541,794 A 11/1970 Johnston et al.
3,550,855 A 12/1970 Feld et al.
3,610,534 A 10/1971 Medawar
3,640,468 A 2/1972 Searle et al.
3,660,982 A 5/1972 Gozlan
3,684,182 A 8/1972 Maison
3,856,239 A 12/1974 Leibach
4,047,381 A 9/1977 Smith
4,129,269 A 12/1978 Fage
4,175,385 A 11/1979 Nash
4,182,501 A * 1/1980 Fage ......................... 244/110 B
4,212,442 A * 7/1980 Fage ......................... 244/110 B
4,232,516 A 11/1980 Lewis et al.
4,292,803 A 10/1981 Prior
4,362,015 A * 12/1982 Fage ............................ 60/226.2
4,422,605 A * 12/1983 Fage ......................... 244/110 B
4,424,669 A * 1/1984 Fage ......................... 244/110 B
4,519,561 A 5/1985 Timms
4,581,890 A 4/1986 Giraud
4,682,733 A 7/1987 Newton
4,801,112 A 1/1989 Fournier
4,830,519 A 5/1989 Starke
4,836,451 A 6/1989 Herrick et al.

(Continued)

FOREIGN PATENT DOCUMENTS

FR 2601077 1/1988

(Continued)

OTHER PUBLICATIONS

U.S. Appl. No. 11/941,378, filed Nov. 16, 2007, entitled "Thrust Reverser for a Turbofan Gas Turbine Engine", by Jean-Pierre Lair.

(Continued)

*Primary Examiner* — Timothy D Collins
*Assistant Examiner* — Steven Hawk
(74) *Attorney, Agent, or Firm* — Francis L. Conte

(57) ABSTRACT

A pivot arrangement for a thrust reverser door of a gas turbine engine, the pivot fitting having a base and a shaft projecting from a main side of the base. The shaft receives a preferably curved pivot arm of the door to provide a low profile arrangement which improves performance when the doors are stowed.

27 Claims, 5 Drawing Sheets

U.S. PATENT DOCUMENTS 4,860,956 A 8/1989 Fage
4,865,256 A 9/1989 Durand
4,894,985 A 1/1990 Dubois
4,909,346 A 3/1990 Torkelson
4,914,905 A 4/1990 Dubois
4,916,895 A 4/1990 Dubois
4,922,712 A 5/1990 Matta
4,922,713 A 5/1990 Barbarin
4,960,243 A 10/1990 Dubois
4,966,327 A 10/1990 Fage et al.
4,976,466 A 12/1990 Vauchel
4,998,409 A 3/1991 Mutch
5,003,770 A 4/1991 Schegerin
5,039,171 A 8/1991 Lore
5,040,730 A 8/1991 Hogie
5,083,426 A 1/1992 Layland
5,090,197 A 2/1992 Dubois
5,097,661 A * 3/1992 Lair et al. .................... 60/226.2
5,101,621 A 4/1992 Mutch
5,117,630 A 6/1992 Cariola
5,120,004 A 6/1992 Matthias
5,167,118 A 12/1992 Torkelson
5,176,340 A 1/1993 Lair
5,181,676 A 1/1993 Lair
5,192,023 A 3/1993 Fage et al.
5,197,693 A 3/1993 Remlaoui
5,203,525 A 4/1993 Remlaoui
5,209,057 A 5/1993 Remlaoui
5,211,008 A 5/1993 Fage
5,221,048 A 6/1993 Lair
5,224,342 A 7/1993 Lair
5,228,641 A 7/1993 Remlaoui
5,230,213 A 7/1993 Lawson
5,243,817 A 9/1993 Matthias
5,251,435 A 10/1993 Pauley
5,267,438 A 12/1993 Bunel
5,284,015 A 2/1994 Carimali
5,297,387 A 3/1994 Carimali
5,309,711 A 5/1994 Matthias
5,310,117 A * 5/1994 Fage et al. ................ 244/110 B
5,347,808 A 9/1994 Standish
5,372,006 A 12/1994 Lair
5,390,879 A 2/1995 Lair
5,392,991 A 2/1995 Gatti
5,396,762 A 3/1995 Standish
5,419,515 A 5/1995 Lair
5,440,875 A 8/1995 Torkelson
5,473,886 A 12/1995 Lebrun
5,524,431 A 6/1996 Brusson
5,548,954 A 8/1996 de Cambray
5,558,594 A 9/1996 Lefranc
5,615,549 A 4/1997 Valleroy
5,615,834 A 4/1997 Osman
5,655,360 A 8/1997 Butler
5,666,802 A 9/1997 Lair
5,671,598 A 9/1997 Standish
5,716,025 A 2/1998 Meyer
5,720,449 A 2/1998 Laboure
5,725,182 A 3/1998 Valleroy
5,727,380 A 3/1998 Lardy et al.
5,730,392 A 3/1998 Lair
5,765,362 A 6/1998 Gonidec
5,775,097 A 7/1998 Lardy
5,775,639 A * 7/1998 Fage ........................ 244/110 B
5,778,659 A 7/1998 Duesler
5,778,660 A 7/1998 Jean
5,779,192 A 7/1998 Metezeau et al.
5,782,434 A 7/1998 Jean
5,785,249 A 7/1998 Metezeau
5,794,433 A * 8/1998 Peters et al. ............. 244/110 B
5,799,903 A 9/1998 Vauchel
5,806,302 A 9/1998 Cariola
5,813,220 A 9/1998 Portal
5,819,527 A 10/1998 Fournier
5,819,528 A 10/1998 Masson
5,826,823 A 10/1998 Lymons
5,836,149 A * 11/1998 Servanty .................. 244/110 B
5,852,928 A 12/1998 Vauchel
5,853,148 A 12/1998 Standish
5,863,014 A 1/1999 Standish
5,875,995 A 3/1999 Moe
5,893,265 A 4/1999 Gonidec
5,899,059 A 5/1999 Gonidec
5,904,041 A 5/1999 Dhainault
5,913,476 A 6/1999 Gonidec
5,927,647 A 7/1999 Masters
5,930,991 A 8/1999 Fournier
5,934,613 A 8/1999 Standish
5,937,636 A 8/1999 Gonidec
5,947,625 A 9/1999 Vauchel
5,956,939 A 9/1999 Fage
5,960,626 A 10/1999 Baudu
5,967,460 A 10/1999 Baudu
5,970,704 A 10/1999 Lardy
5,974,783 A 11/1999 Gonidec
5,983,625 A 11/1999 Gonidec
5,987,881 A 11/1999 Gonidec
5,996,937 A 12/1999 Gonidec
5,997,054 A 12/1999 Baudu
6,000,216 A 12/1999 Vauchel
6,009,702 A 1/2000 Gonidec
6,026,638 A 2/2000 Gonidec
6,027,071 A * 2/2000 Lair ......................... 244/110 B
6,029,439 A 2/2000 Gonidec
6,032,901 A 3/2000 Carimali
6,044,641 A 4/2000 Baudu
6,045,091 A 4/2000 Baudu
6,065,285 A 5/2000 Gonidec
6,068,213 A 5/2000 Gonidec
6,076,347 A 6/2000 Gonidec
6,079,201 A 6/2000 Jean
6,082,096 A 7/2000 Vauchel
6,094,908 A 8/2000 Baudu
6,101,807 A 8/2000 Gonidec
6,105,439 A 8/2000 Roger
6,145,301 A 11/2000 Gonidec
6,145,786 A 11/2000 Baudu
6,148,607 A 11/2000 Baudu
6,151,884 A 11/2000 Gonidec
6,151,885 A 11/2000 Metezeau
6,151,886 A 11/2000 Vauchel
6,158,211 A 12/2000 Gonidec
6,170,254 B1 1/2001 Cariola
6,170,255 B1 1/2001 Gonidec
6,173,807 B1 1/2001 Welch et al.
6,216,980 B1 4/2001 Baudu
6,237,325 B1 5/2001 Hogie
6,256,979 B1 7/2001 Fournier
6,260,801 B1 * 7/2001 Peters et al. ............. 244/110 B
6,276,026 B1 8/2001 Wille
6,293,495 B1 9/2001 Aten
6,357,672 B1 3/2002 Cowan et al.
6,385,964 B2 5/2002 Jean
6,402,092 B1 6/2002 Jean
6,438,942 B2 8/2002 Fournier
6,487,845 B1 * 12/2002 Modglin et al. .......... 244/110 B
6,546,715 B1 4/2003 Blevins
6,546,716 B2 4/2003 Lair
6,568,172 B2 5/2003 Jannetta et al.
6,584,763 B2 7/2003 Lymons
6,592,074 B2 7/2003 Dehu
6,622,964 B2 9/2003 Rouyer
6,688,098 B2 2/2004 Rouyer
6,688,099 B2 2/2004 Lair
6,751,944 B2 6/2004 Lair
6,786,038 B2 9/2004 Lair
6,804,947 B2 10/2004 Le Docte
6,820,410 B2 11/2004 Lair
6,845,607 B2 1/2005 Lair
6,845,946 B2 1/2005 Lair
6,869,046 B2 * 3/2005 McEvoy ........................ 244/54
6,895,742 B2 5/2005 Lair et al.
6,910,328 B1 6/2005 Joyce
6,926,234 B2 8/2005 Colotte
6,938,408 B2 9/2005 Lair
6,945,031 B2 9/2005 Lair
6,966,175 B2 11/2005 Lair

| | | | | |
|---|---|---|---|---|
| 6,968,675 | B2 | 11/2005 | Ramlaoui et al. | |
| 6,971,229 | B2 | 12/2005 | Lair | |
| 6,976,352 | B2 | 12/2005 | Lair | |
| 6,983,588 | B2 | 1/2006 | Lair | |
| 6,993,819 | B2 | 2/2006 | Homann | |
| 7,007,454 | B2 | 3/2006 | Dehu | |
| 7,010,905 | B2 | 3/2006 | Lair | |
| 7,043,897 | B2 | 5/2006 | Osman | |
| 7,055,329 | B2 | 6/2006 | Martens et al. | |
| 7,093,793 | B2 | 8/2006 | Lair | |
| 7,104,500 | B1 * | 9/2006 | Smith | 244/110 B |
| 7,127,880 | B2 | 10/2006 | Lair | |
| 7,146,796 | B2 | 12/2006 | Lair | |
| 7,229,247 | B2 | 6/2007 | Durocher et al. | |
| 7,255,307 | B2 | 8/2007 | Mayes | |
| RE39,972 | E | 1/2008 | Royalty | |
| 7,735,778 | B2 * | 6/2010 | Lair et al. | 244/110 B |
| 2003/0218094 | A1 * | 11/2003 | Lair | 244/110 B |
| 2004/0139726 | A1 | 7/2004 | Colotte | |
| 2005/0151012 | A1 | 7/2005 | Lair | |
| 2005/0183894 | A1 | 8/2005 | Lair | |
| 2006/0005530 | A1 | 1/2006 | Blin | |
| 2006/0288688 | A1 | 12/2006 | Lair | |
| 2008/0072570 | A1 | 3/2008 | Lair | |

FOREIGN PATENT DOCUMENTS

| | | |
|---|---|---|
| WO | 86/00862 A1 | 2/1986 |

OTHER PUBLICATIONS

U.S. Appl. No. 11/941,360, filed Nov. 16, 2007, entitled "Thrust Reverser Door", by Jean-Pierre Lair.

U.S. Appl. No. 11/941,395, filed Nov. 16, 2007, entitled "Pivoting Fairings for a Thrust Reverser", by Jean-Pierre Lair.

U.S. Appl. No. 11/941,391, filed Nov. 16, 2007, entitled "Thrust Reverser Door", by Jean-Pierre Lair.

U.S. Appl. No. 11/941,388, filed Nov. 16, 2007, entitled "Thrust Reverser", by Jean-Pierre Lair.

U.S. Appl. No. 12/142,084, filed Jun. 19, 2008, entitled "Thrust Reverser for a Turbofan Gas Turbine Engine", by Jean-Pierre Lair and Paul Weaver.

* cited by examiner

PIVOTING DOOR THRUST REVERSER FOR A TURBOFAN GAS TURBINE ENGINE

TECHNICAL FIELD

The invention relates to thrust reverser doors for turbofan gas turbine engines.

BACKGROUND

A thrust reverser of the bucket/target type has doors that can be moved from a stowed position to a deployed position so as to deflect at least a portion of the gases coming out of the gas turbine engine and create a braking force slowing down the aircraft. The deflected gases come from the by-pass flow or from both the by-pass flow and the core flow of the engine.

Challenges in the design of thrust reversers include the need to minimize weight and to provide the various parts within the smallest possible space. It will be appreciated that the actuators, door pivots and pivot arms of a thrust reverser must fit within the envelope provided between the outer mold line (OML) and inner mold line (IML) of the nacelle and thrust reverser.

Traditionally, these components are relatively bulky, and thus a significant envelope or space is required between OML and IML to accommodate them, resulting in a larger nacelle outer surface results and increased drag, in comparison to a nacelle without a thrust reverser. Therefore, the pivots and mounting of the thrust reverser doors is one area where improvements are possible.

SUMMARY

In one aspect, the present concept provides a door pivot arrangement for a thrust reverser, the arrangement comprising at least one pivot fitting having a shaft projecting from a first side of a base, the shaft extending through an opening in a jet pipe of the thrust reverser, the base remaining on the inside of the jet pipe while the shaft projects through the opening to the outside of the jet pipe, the opening sized to allow the shaft to pass therethrough but prevent the base from passing therethrough, the shaft rotatably receiving a pivot arm of the door.

In another aspect, the present concept provides a door pivot fitting arrangement for a thrust reverser, the arrangement comprising a jet pipe having at least one recess and at least one pivot fitting having a base, the base configured and shaped to be mounted in the recess; and a pivot extending outwardly from the base for connecting one side of a thrust reverser door to the pivot fitting.

In another aspect, the present concept provides a thrust reverser comprising: first and second doors, each having a pair of opposed pivot arms; a jet pipe; and a pair of pivot fittings inserted into corresponding recesses inside each jet pipe arm, each pivot fitting having a projection extending outwardly through an opening in the jet pipe, each projection received in a pivot hole in a corresponding pivot arm.

In another aspect, the present concept provides a method of pivotally connecting a thrust reverser door to a thrust reverser, the method comprising the steps of: providing an opening in an exhaust nozzle of the jet pipe; providing a door having a pivot hole; inserting a pivot fitting through the opening from an inside of the nozzle so that a pivot of the pivot fitting extends to an outward side of the nozzle and through the pivot hole of the door; and attaching the pivot fitting to nozzle.

In another aspect, the present concept provides a door for a thrust reverser having an exit nozzle, the exit nozzle having a radius of curvature, the door comprising a circumferentially-extending thrust deflecting portion and a pair of pivot arms disposed on either side of the deflecting portion, the pivot arms configured to pivotally mount the door to a thrust reverser, the arms extending from thrust deflecting portion to a free end, the arms having at least one radius of curvature.

In another aspect, the present concept provides a thrust reverser having a first side and a second side, a pair of first side door pivots and a pair of second side door pivots, and a first side thrust-reverser door and a second side thrust-reverser door, the doors each having a pair of pivot arms extending therefrom, the first side door mounted on the first side of the thrust reverser through connection to the second side pivots, the second side door mounted on the second side of the thrust reverser through connection to the first side pivots, the first and second door pivot arm thus crossing one another when the doors are closed, wherein the pivot arms are inwardly curved and wherein at least one of the doors has pivot arms which are curved to avoid interference with the pivot arms of the other door.

Further details of these and other aspects of the improvements presented herein will be apparent from the detailed description and appended figures.

DETAILED DESCRIPTION

Figure 1:
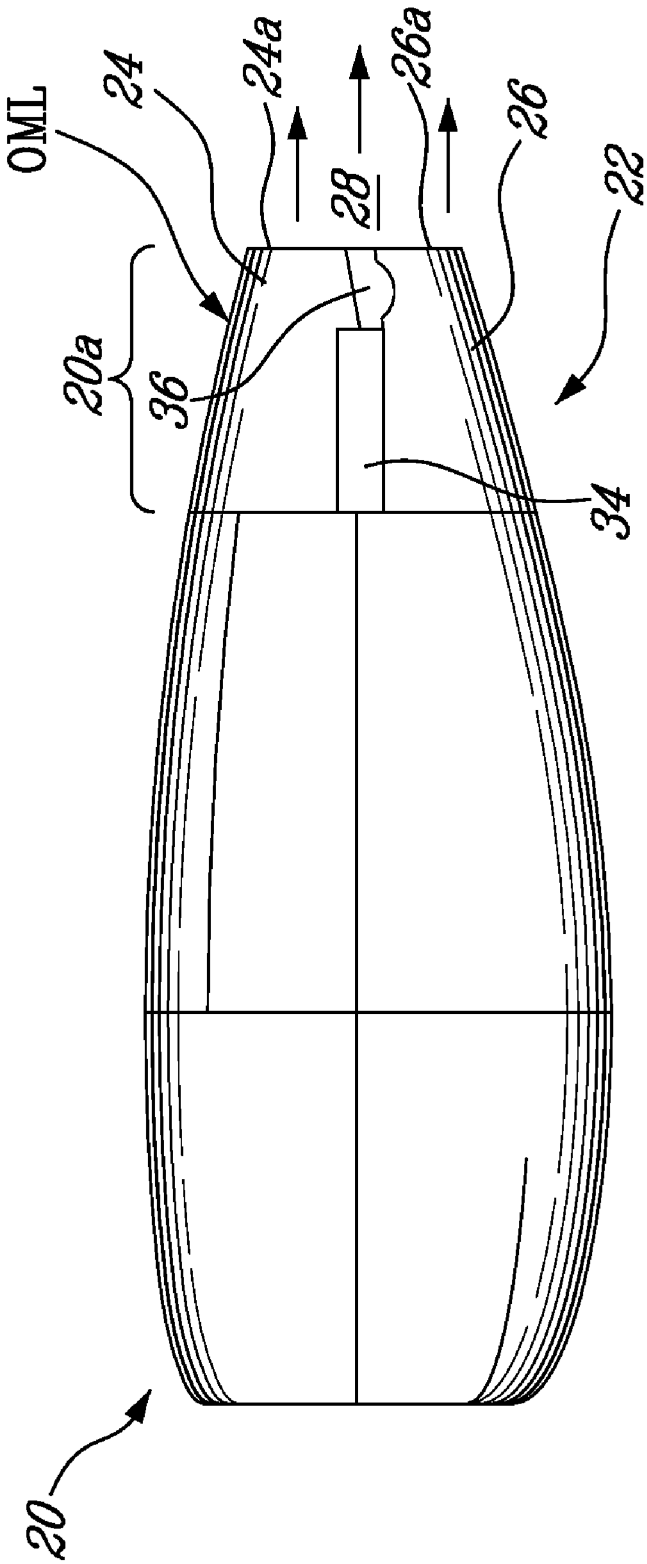
FIG. 1 is a side view of an example of a nacelle provided with a thrust reverser, its doors being shown in a stowed position.

Referring now to FIG. 1, there is shown an example of a nacelle 20 including a thrust reverser 22 in the aft section 20*a* of the nacelle 20. The turbofan gas turbine engine is located within the nacelle 20 and the nacelle 20 is attached under the wings or on the fuselage of the aircraft using an appropriate arrangement (not shown).

The thrust reverser 22 comprises two opposite pivoting doors 24, 26 forming most of the exhaust nozzle of the nacelle 20 when they are in their stowed position. In the example illustrated in FIG. 2, one door 24 is at the upper side and the other door 26 is at the bottom side. The nacelle 20 defines an outer aerodynamic shape, referred to herein as the outer mold line (OML) of the assembly.

Figure 3:
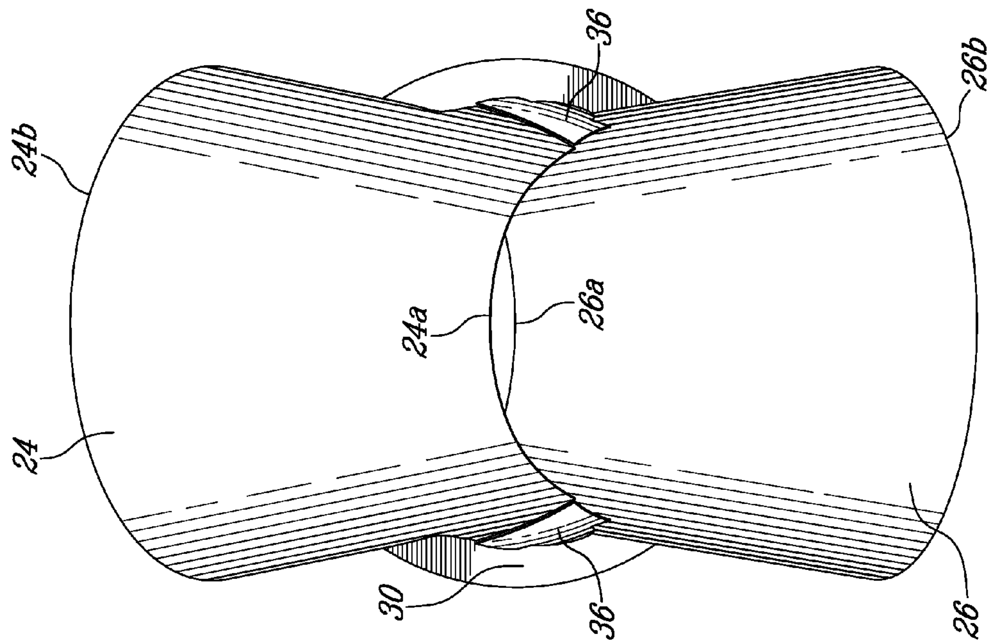
FIG. 3 is a rear view of what is shown in FIG. 2.
Figure 2:
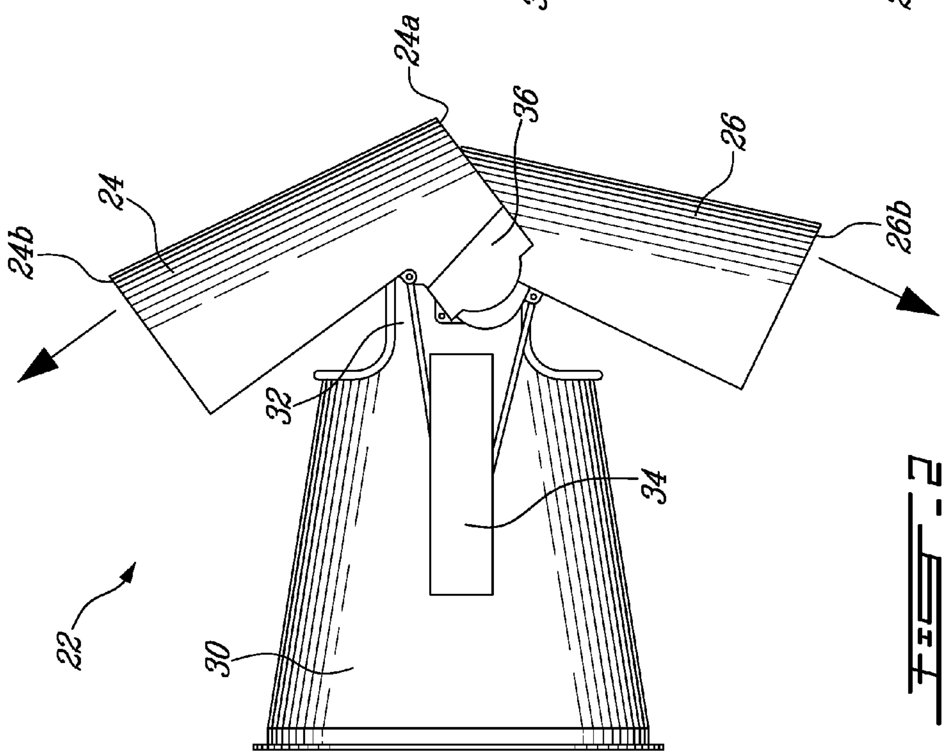
FIG. 2 is a schematic side view of an example of a jet pipe to which are connected thrust reverser doors, which doors are shown in a deployed position.

Each door 24, 26 has a trailing edge 24*a*, 26*a* adjacent to the propulsive jet outlet 28. The arrows in FIG. 1 show the direct thrust operation of the engine. FIG. 2 is an enlarged view showing an example of a jet pipe 30 to which the doors 24, 26 are pivotally connected. The doors 24, 26 are in their deployed position in FIG. 2. FIG. 3 is a rear view of what is shown in FIG. 2.

The jet pipe 30 is concealed inside the aft section 20a of the nacelle 20 when the doors 24, 26 are in their stowed position, as in FIG. 1. It will be understood that the interior of the jet pipe, together with the interior of the doors when stowed, defines an inner aerodynamic shape or nozzle for direct exhaust gases of the engine, and this inner shape is referred to herein as the inner mold line (IML) of the assembly (see FIG. 5).

The arrows in FIG. 2 indicate the main flow path when the engine is operated during a thrust reversal. As can be seen, exhaust gases from the engine are redirected substantially forwardly when the doors 24, 26 are in their deployed position. The gases exit the doors 24, 26 in the vicinity of their leading edges 24b, 26b. These edges 24b, 26b are located at the front of the doors 24, 26 and are referred to as “leading” edges with reference to the travel path of the aircraft.

The redirection of the exhaust gases from the engine creates a resulting horizontal retarding force opposing the forward movement of the aircraft. Increasing the output thrust generated by the engine increases the aerodynamic decelerating force.

Also, in the illustrated example, the trailing edge 24a of the upper door 24 is pivoted behind the trailing edge 26a of the lower door 26, this resulting from the asymmetrical positioning of the pivots with reference to the horizontal medial plane of the jet pipe 30, as described in applicant's co-pending application Ser. No. 11/534,202, filed Sep. 21, 2006.

It should be noted that most of the details about actuators, the pivots and the mechanisms provided to lock the front of the doors 24, 26 during the direct thrust operation of the engine have been omitted from FIGS. 2 and 3, for clarity. It will be understood that an actuator system is to be provided on each side of the jet pipe 30, for instance, generally underneath a fairing 34 between the longitudinal sides of the doors 24, 26 when the doors are in their stowed position.

Also, in the illustrated example a fairing 36 is provided for covering the door pivots when the doors are stowed. Fairings 34, 36 of course merge smoothly with nacelle 20 and doors 24, 26, when the doors are stowed, to provide an aerodynamically smooth outer mold line (OML) to the assembly. The actuators, pivots and pivot arms of the doors must reside within the envelope defined by the outer mold line (OML) and inner mold line (IML).

Figure 4:
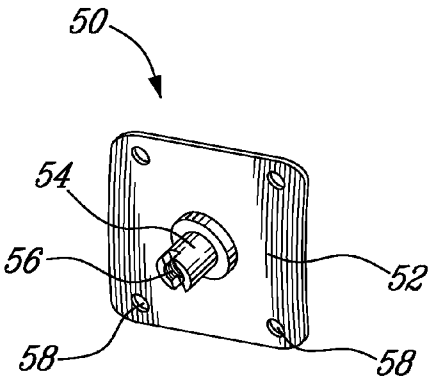
FIG. 4 is an enlarged isometric view showing an example of the improved pivot fitting.

FIG. 4 shows an example of an individual pivot fitting 50. The pivot fitting 50 comprises a base 52 having a slightly arcuate shape. The curvature of the base 52 corresponds to the curvature of the jet pipe arm 32 in which the pivot fitting 50 will be positioned, and thus each pivot is designed to substantially follow the curvature of the space between the OML and IML and thus minimize the envelope needed therebetween. The illustrated base 52 is substantially rectangular. Other shapes can be used as well.

The pivot fitting 50 also includes a shaft 54 projecting from one of the main sides of the base 52, namely the side that will be toward the outside of the reverser assembly. The shaft 54 is disposed on the base so that it projects normally to the plane of door rotation, i.e. provides an axis for door rotation, and preferably all pivot shafts 54 will be parallel or coaxial with one another, as the case may be, when installed on the reverser.

The shafts 54 preferably include a coaxially disposed threaded bore 56 defined in the free end of the shaft. This threaded bore 56 can be used to receive a bolt, as explained hereafter. The base 52 also includes holes 58 for receiving fasteners.

Figure 5:
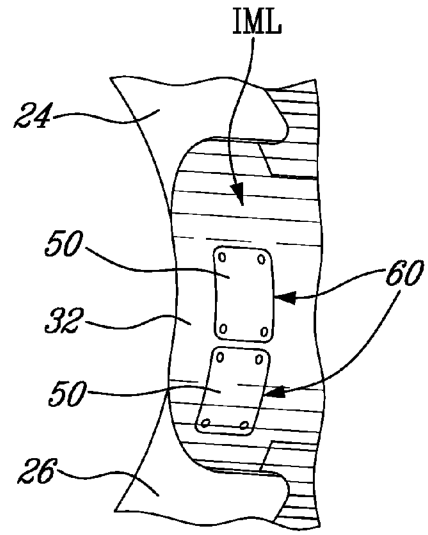
FIG. 5 is an isometric view showing a pair of pivot fittings being flush mounted inside a jet pipe.

FIG. 5 shows an example of the interior of a jet pipe arm 32 in which two pivot fittings 50 are provided. Each pivot fitting 50 is inserted into a recess 60 that is configured and disposed so that the pivot fittings 50 will be flush mounted with reference to the inner surface of the jet pipe arm 32, so that the aerodynamics of inner mold line (IML) of the jet pipe is not affected.

The recess 60 is, for instance, a cut-away portion or a punched portion of the jet pipe arm 32. The jet pipe arm 32 also includes a side opening corresponding to each pivot fitting 50 for receiving its shaft 54.

Figure 6:
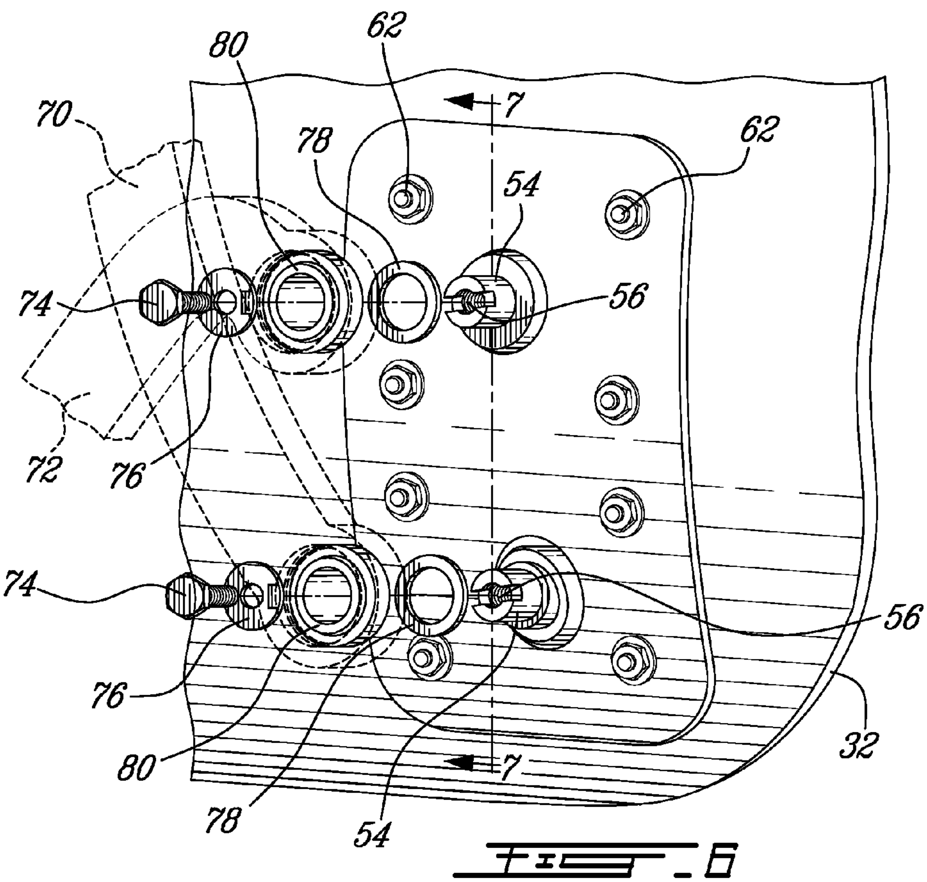
FIG. 6 is an isometric and partially exploded view showing the pivot fittings of FIG. 5 from outside the jet pipe.

Each shaft 54 outwardly projects with reference to the jet pipe arm 32, as shown for instance in FIG. 6. FIG. 6 also shows that the illustrated pivot fittings 50 are connected to the jet pipe arm 32 using a plurality of bolts 62. Other fastening arrangements are also possible.

While it is possible to provide two shafts 54 on a same side of a single base, the illustrated example uses two distinct pivot fittings 50, namely an upper door pivot fitting and a lower door pivot fitting, each having their own shaft 54. This facilitates maintenance since it is possible to only remove one door at a time. Each pivot fitting 50 is removable from inside the jet pipe 30.

Figure 7:
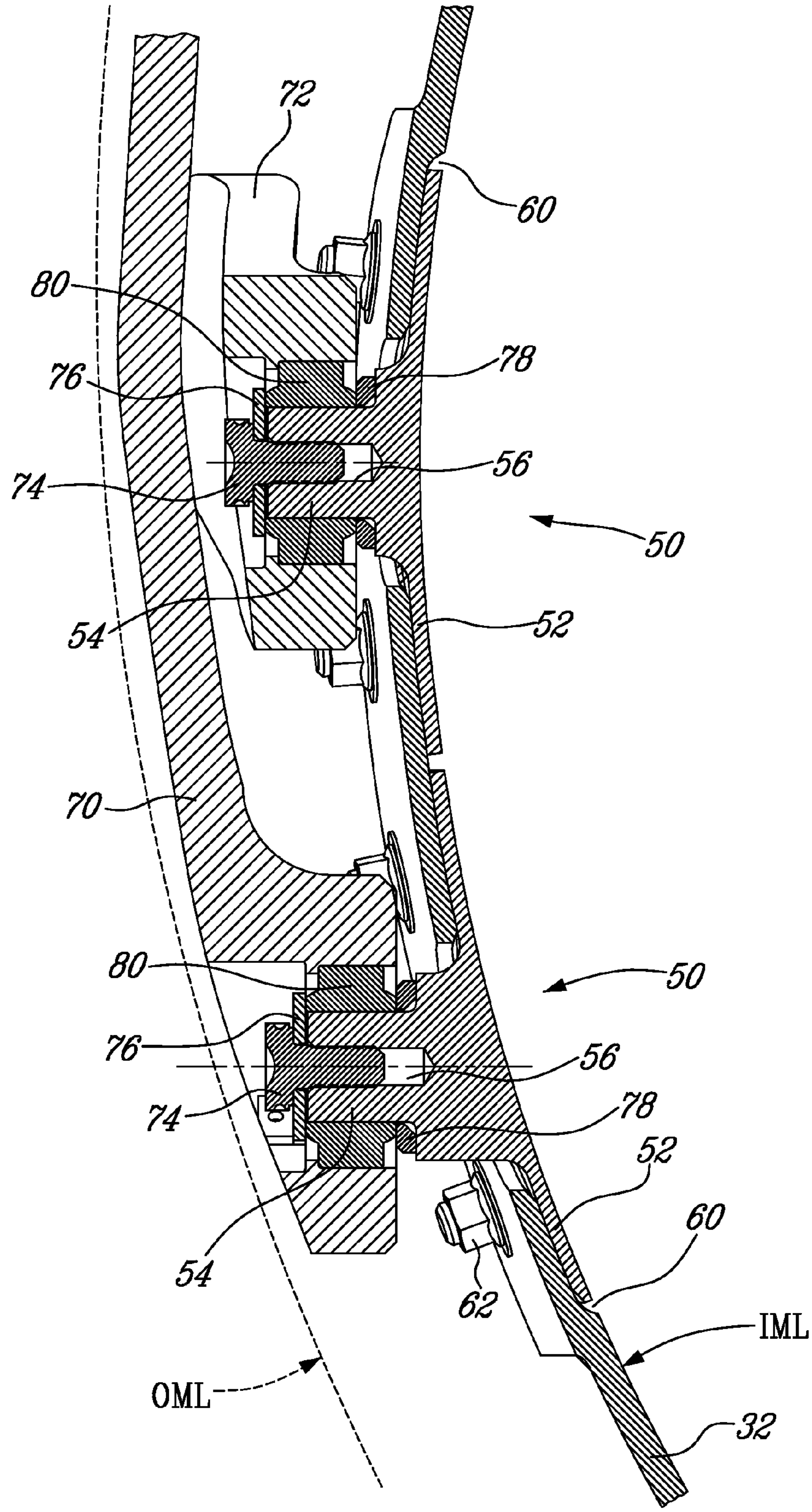
FIG. 7 is a cross-sectional view taken along line 7-7 in FIG. 6.

FIG. 7 is a cross sectional view taken along line 7-7 in FIG. 6. It shows the pivot fitting 50 being flush mounted inside the jet pipe arm 32. Bolts 62 are used in the illustrated embodiment for connecting the pivot fitting 50 to the jet pipe arm 32. The bolts heads can be hidden in chamfered holes. Also, FIG. 7 shows that the recess of the jet pipe arm 32 may require a reinforcement layer or embossed portion on the opposite side. This layer or portion is also shown in FIG. 6.

Figure 8:
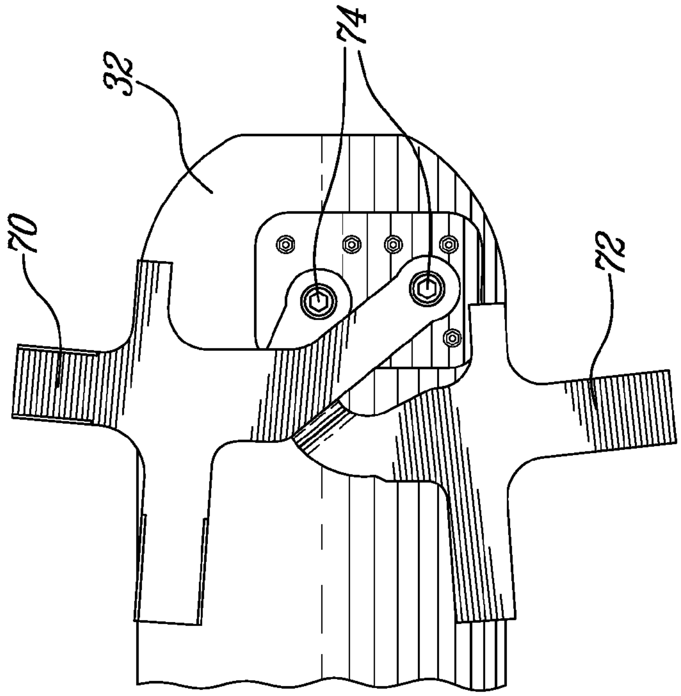
FIG. 8 is a side view showing an example of pivot arms being mounted on the shafts of the pivot fittings of FIGS. 5 and 6.

FIG. 8 shows the arrangement of FIG. 6 when assembled. FIG. 8 shows the pivot arm 70 for the upper door 24 and the pivot arm 72 for the lower door 26. The pivots for these pivot arms 70, 72 are asymmetrically disposed with reference to a medial plane of the jet pipe arm 32, as described in applicant's co-pending application Ser. No. 11/534,202, filed Sep. 21, 2006.

The pivot arms 70, 72 are preferably overlapping or crossing one another when the doors 24, 26 are in their stowed position, which thus allows a planar exit of the thrust reverser nozzle when the doors are stowed. Other arrangements are possible as well. FIG. 8 also shows that one end of the pivot arms 70, 72 has a pivot receiving hole for coaxial mounting the door on the shaft 54 of the corresponding pivot fitting 50 (the other end of each pivot arm is mounted to, or integrated with, its associated door 24, 26).

A bearing 80 (see FIG. 7), preferably a spherical type, separates the pivot arm 70, 72 from the shaft 54. The bearings 80 lower the friction to a minimum and compensates any slight misalignment of the pivoting axis of the doors.

The pivot arms 70, 72 may be connected to the corresponding shafts 54 and secured via a bolt 74 provided in the threaded bore 56 of the shaft 54, as best shown in FIG. 7. Each bolt 74 is used with a set of washers 76, 78, one of which 76 is a bendable lock washer cooperating with a notch in the shaft 54 for preventing the bolt 74 from rotating once it is installed.

The other washer 78 separates the inner side of the pivot arms 70,72 from the outer side of the bases 52 and has a width selected to provide a desired space upon adjustment of the door, and thereby provides adjustment of the reverser door in the transverse direction for easier adjustment of the reverser door position. Other arrangements can also be used as well.

The bolts 74 can be prevented from rotating using any other accepted methods in aeronautics.

The shaft 54 is sized for adequately taking the loading conditions in direct and reverse thrust, and has an adequate diameter for supporting the bearing 80 installed on each shaft 54.

Referring to FIG. 8, each pivot arm 70, 72 has a curvature about the engine selected to follow the curvature of the space available between the OML and IML, and the hinges are configured to cross each other when the reverser doors move towards their stowed position.

Lower pivot arm 72 is curved generally to follow the local outer profile of the jet pipe 30. Upper pivot arm 70 is curved to follow the local outer profile of the jet pipe 30, but also to avoid interference with lower pivot arm 72 (since the arms cross one another).

This curvature assists in reducing the profile of the door-hinge arrangement, and allows a further reduction in the OML of the assembly. The skilled reader will appreciate that any suitable radius (or radii) of curvature may be provided, and that the "curvature" need not be continuous, nor arcuate, as depicted.

Figure 9:
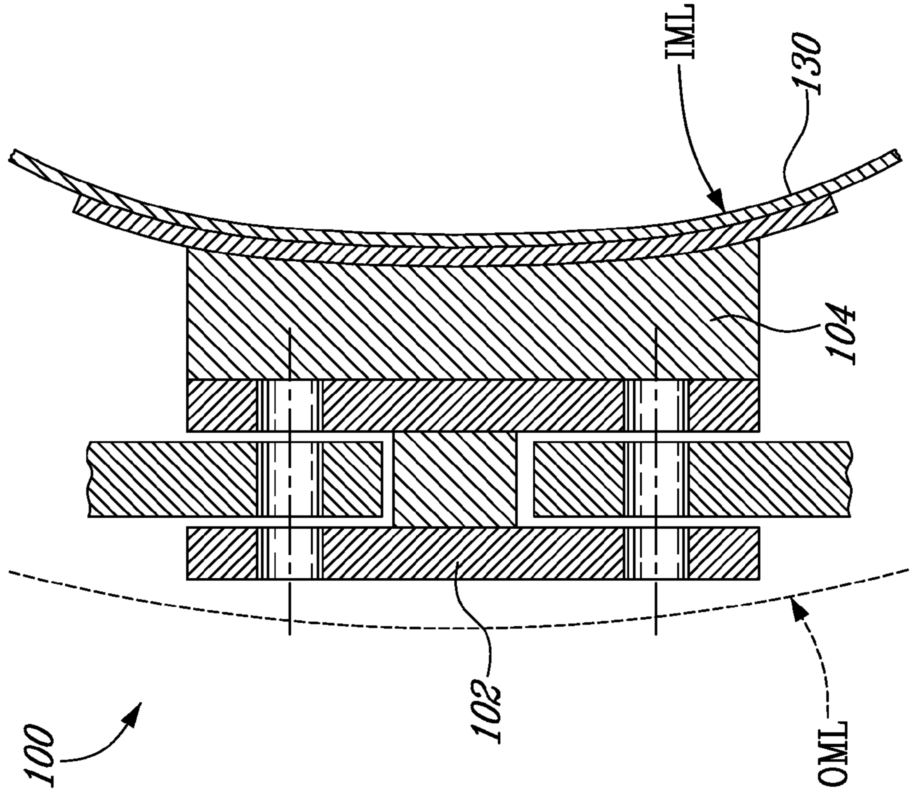
FIG. 9 is a view similar to FIG. 7, schematically showing a prior art arrangement for comparison purposes.

FIG. 9 schematically shows a prior art thrust reverser hinge arrangement. Each pivot fitting 100 has a clevis 102 that has an integral base 104 riveted to the jet pipe 130. The jet pipe 130 defines an inner mold line (IML) and the nacelle or thrust reverser outer skin defines an outer mold line (OML) for the assembly.

As can be seen by a comparison of FIGS. 7 and 9, the envelope required to fit the prior art configuration is significantly larger than that required to fit the arrangement described above. Relative to the present approach, the prior art has a significantly larger OML and nacelle wetted area, factors that contribute to the increase of the nacelle drag when the reverser nozzle is in its stowed position, in order to accommodate the larger apparatus of the prior art.

Referring now to FIGS. 6 and 7, to mount a thrust reverser door 24, 26 onto jet pipe 30, e.g. during assembly or after maintenance, one positions the thrust reverser doors, then inserts a pivot fitting 50 inside the jet pipe 30 through its cutout and slides its shaft 54 (that is outwardly projecting through a side opening of the jet pipe 30) through the end of the pivot arm 70, 72 and bearing 80 of the door 24, 26, and then mounts a nut or other fastener to the shaft for securing the reverser door arms on their respective shaft.

As can be appreciated, the pivot fittings 50 and pivot arms 70, 72 provide both a low profile and light structure to which the thrust reverser doors 24, 26 can be attached, and thereby assist in reducing the overall nacelle wetted area, as well as assembly weight.

The above description is meant to be exemplary only, and one skilled in the art will recognize that other changes may also be made to the embodiments described without departing from the scope of the invention disclosed as defined by the appended claims. For instance, the shapes of the doors and the configuration of these doors with reference to each other may be different to what is shown and described. The shape and configuration of the base can be different to the rectangular one shown in the figures.

The illustrated shaft can be replaced by a similar shaft-like member, for instance a large bolt or peg that is partially inserted in a corresponding threaded hole at the center of the base. The shaft-like member can also be made removable if, for instance, it is connected to the base by the threaded bolt holding the door or by a threaded end.

It should be noted that although the doors 24, 26 are described herein and shown in the figures as being an upper reverser door 24 and a lower reverser door 26 movable in a vertical plane, doors may be configured with another suitable orientation, such as a left door and right door movable in a horizontal plane. Other suitable arrangements are possible as well.

Still other modifications within the spirit of the present invention will be apparent to those skilled in the art, in light of a review of this disclosure, and such modifications are intended to fall within the scope of the appended claims.

What is claimed is:

1. A thrust reverser comprising:

first and second doors, each having a pair of opposed pivot arms;

a jet pipe having a pair of jet pipe arms and a radially inner mold line surface for bounding discharge of exhaust gas; and a pair of pivot fittings inserted into corresponding recesses radially inside each jet pipe arm substantially flush with said inner mold line surface, each pivot fitting having a projection extending outwardly through an opening in the jet pipe arm, each projection received in a pivot hole in a corresponding pivot arm.

2. A thrust reverser according to claim 1 wherein each pivot fitting has a shaft projecting from a first side of a base, the shaft extending through said opening in said jet pipe arm, the base remaining on the inside of the jet pipe while the shaft projects through the opening to the outside of the jet pipe, the opening sized to allow the shaft to pass therethrough but prevent the base from passing therethrough, the shaft rotatably receiving said pivot arm of the door.

3. The thrust reverser as defined in claim 2, wherein the shaft comprises a fastening assembly for securing an end of the pivot arm of the thrust reverser door.

4. The thrust reverser as defined in claim 2, further comprising a plurality of threaded fasteners removably securing the base to the jet pipe.

5. The thrust reverser as defined in claim 2, wherein the jet pipe has a recess co-operatively receiving the base.

6. The thrust reverser as defined in claim 2, wherein the base is mounted to the jet pipe from an inside of the jet pipe.

7. The thrust reverser as defined in claim 2, wherein the base has a second side which is substantially flush with said inner mold line surface of the jet pipe.

8. The thrust reverser as defined in claim 7, wherein the base second side has a radius of curvature substantially the same as a radius of curvature of the jet pipe in the region where the base is mounted.

9. The thrust reverser as defined in claim 2, further comprising a washer separating an inner side of the pivot arm from the first side of the base, the washer having a width selected to provide a desired spacing upon adjustment of the door.

10. The thrust reverser as defined in claim 1, wherein each pivot fitting has a base mounted to the jet pipe from inside of the jet pipe.

11. The thrust reverser as defined in claim 10, wherein each base has an inner side which is substantially flush with said inner mold line surface of the jet pipe.

12. The thrust reverser as defined in claim 11, wherein the inner side of each base has a radius of curvature substantially the same as a radius of curvature of the jet pipe in the region where the base is mounted.

13. The thrust reverser as defined in claim 1, wherein each pivot fitting includes fasteners extending therethrough for fastening the fitting to the jet pipe.

14. The thrust reverser as defined in claim 10, further comprising a washer separating an inner side of the pivot arm from an outer side of the base, the washer having a width selected to provide a desired spacing upon adjustment of the door.

15. A method of pivotally connecting a thrust reverser door to a thrust reverser according to claim 1, the method comprising the steps of:

providing said opening in one of said jet pipe arms;

providing said first door having said pivot hole;

inserting a first pivot fitting through the opening from an inside of the jet pipe so that said projection defines a pivot of the first pivot fitting extending to an outward side of the jet pipe and through the pivot hole of the first door; and attaching the first pivot fitting to said one jet pipe arm.

16. The method as defined in claim 15, further comprising repeating said steps to provide a second pivot connection for the second door.

17. The method as defined in claim 15, further comprising the step of connecting a fastener to a free end of the first pivot to retain the first door to the first pivot.

18. The method as defined in claim 15, further comprising performing said steps in substantially reverse order to disconnect the first door from the thrust reverser.

19. A thrust reverser according to claim 1 wherein:

said first and second doors form an exit nozzle having a radius of curvature; and each door comprises a circumferentially-extending thrust deflecting portion and said pair of pivot arms are disposed on either side of the deflecting portion, the pivot arms configured to pivotally mount the door to said jet pipe, the arms extending from said thrust deflecting portion to a free end, the arms having corresponding radius of curvature following said exit nozzle curvature, with adjacent pivot arms curving around each other.

20. A thrust reverser having a first side and a second side, a pair of first side door pivots and a pair of second side door pivots, and a first side thrust-reverser door and a second side thrust-reverser door, the doors each having a pair of pivot arms extending therefrom, the first side door mounted on the first side of the thrust reverser through connection to the second side pivots, the second side door mounted on the second side of the thrust reverser through connection to the first side pivots, the first and second door pivot arms thus crossing one another when the doors are closed, wherein the pivot arms are inwardly curved and wherein at least one of the doors has pivot arms which are curved to avoid interference with the pivot arms of the other door.

21. The thrust reverser as defined in claim 20, wherein said doors form an exit nozzle having a radius of curvature, and the pivot arm curvature substantially follows the exit nozzle radius of curvature.

22. The thrust reverser as defined in claim 20, wherein the pivot arm curvature is configured to curve around a pivot arm of an adjacently-mounted door of the thrust reverser.

23. A thrust reverser comprising:

a pair of thrust reverser doors surrounding a jet pipe to form an exhaust nozzle having aerodynamic outer and inner mold line surfaces;

said jet pipe including a pair of side arms having radially inner surfaces defining corresponding portions of said inner mold line surface;

each door having a pair of pivot arms pivotally mounted at corresponding pivot fittings to said jet pipe arms; and each of said pivot fittings includes a base disposed radially inside said jet pipe and substantially flush with said inner mold line surface, and a shaft extending outwardly through said jet pipe and pivotally connected to corresponding ones of said pivot arms.

24. A thrust reverser according to claim 23 wherein said pivot fitting bases are fixedly mounted to said jet pipe flush with said inner mold line surface.

25. A thrust reverser according to claim 24 wherein said pivot arms conform in curvature with said exhaust nozzle radially between said outer and inner mold line surfaces.

26. A thrust reverser according to claim 25 wherein each of said pivot fittings further comprises a bearing mounted on said shaft inside a corresponding aperture in said pivot arms, with outer and inner washers bounding said bearing on said shaft, and a bolt engages said shaft to secure in turn said outer washer, bearing, and inner washer on said shaft.

27. A thrust reverser according to claim 25 wherein adjacent pivot arms of said doors cross and overlap each other radially between said outer and inner mold line surfaces.

* * * * *